United States Patent [19]

Rabeh et al.

[11] 4,363,244

[45] Dec. 14, 1982

[54] FLUID VELOCITY METER

[76] Inventors: Riadh H. A. Rabeh, Mitchel Hall, Cranfield Institute of Technology, Cranfield, Bedfordshire; John Hemp, 5 Henson Close, Wharley End, Cranfield, Bedfordshire, both of England

[21] Appl. No.: 204,902

[22] Filed: Nov. 7, 1980

[30] Foreign Application Priority Data

Nov. 8, 1979 [GB] United Kingdom ............... 7938714

[51] Int. Cl.³ .............................................. G01F 1/64
[52] U.S. Cl. ................................. 73/861.08; 324/453
[58] Field of Search ........... 73/861.11, 861.04, 861.07, 73/861.09, 861.08; 324/453, 204, 306, 72, 109; 340/603, 606, 627

[56] References Cited

U.S. PATENT DOCUMENTS

| | | | |
|---|---|---|---|
| 2,491,445 | 12/1949 | Cunningham et al. | 73/861.09 |
| 2,779,917 | 1/1957 | DeBoisblanc | 324/204 |
| 3,636,763 | 1/1972 | Beck | 73/861.04 |
| 3,638,054 | 1/1972 | Honigsbaum | 73/861.09 X |
| 3,753,102 | 8/1973 | Beck . | |

FOREIGN PATENT DOCUMENTS

| | | |
|---|---|---|
| 54-157662 | 12/1979 | Japan . |
| 1270112 | 4/1972 | United Kingdom . |
| 1288853 | 9/1972 | United Kingdom . |
| 1485750 | 9/1977 | United Kingdom . |

OTHER PUBLICATIONS

H. B. Karplus et al.-1978 Ultrasonics Symposium Proceedings (Cherry Hill, N.J., U.S.A., Sep. 25-27, 1978)-pp. 291-295.

M. S. Beck et al., Proceedings of the Conference on Dielectric Materials-(England, Jul. 20-24, 1970)-pp. 38-41.

R. G. Green et al.-J. Phys. E: Sci. Instrum., vol. 11, No. 10, (1978)-pp. 1005-1010.

T. Hair, J. H. Blythe and W. O. Agar, An Optical Method of Measuring Transverse Surface Velocity, Acta Imeko 1967, pp. 191-198.

R. G. Green et al, A Low-Cost Solids Flowmeter for Industrial Use, J. Phys. E: Sci. Instrum, vol. 11, 1978, Great Britain, pp. 1005-1010.

Yoshio Kurita et al, Flow Velocity Measurement Using Spatial Filter, Proceedings of IMEKO Symposium on Flow Measurement and Control in Industry, Tokyo, Japan, Nov. 1979, pp. 239-244.

*Primary Examiner*—Charles A. Ruehl
*Attorney, Agent, or Firm*—Cushman, Darby & Cushman

[57] ABSTRACT

The flow velocity or flow rate of a fluid containing electrical charges or magnetic dipoles is sensed by receiving a noise signal generated by movement of the charges or dipoles, and determining the mean frequency of the received signal.

8 Claims, 7 Drawing Figures

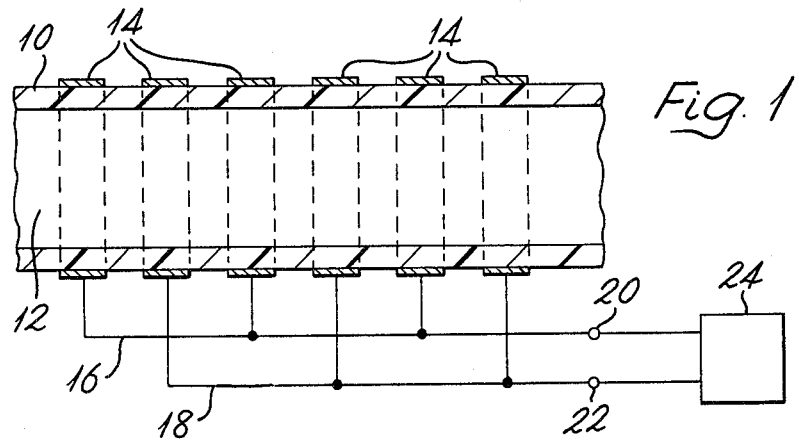
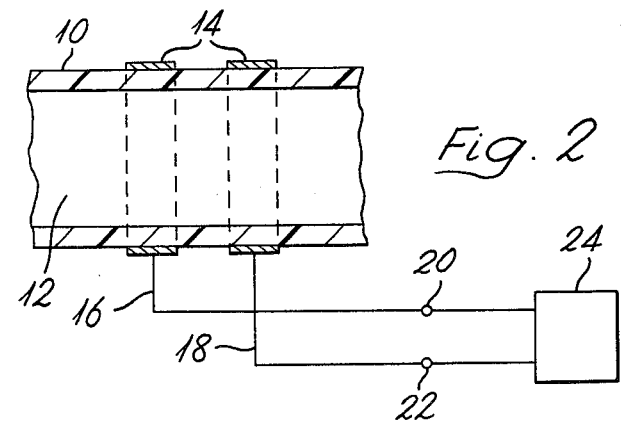
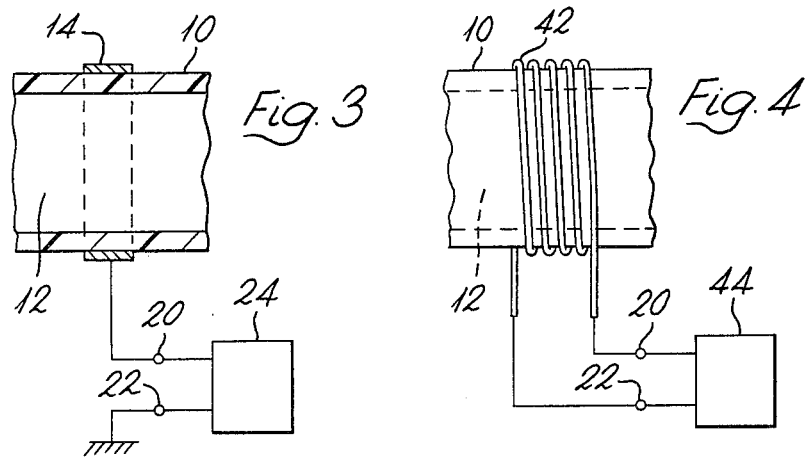

FLUID VELOCITY METER

It is well known that when fluids having low electrical conductivity, such as petrol, oil and gas, flow along a pipe, they contain irregularly distributed static charges generated by fluid motion (triboelectricity). Also fluids carrying particles with permanent magnetic properties contain irregularly distributed magnetic dipoles. It is also known that random fluctuations in a property of the fluid can be sensed at two points spaced in the direction of flow and cross correlated to determine the transit time between the points and therefore the flow velocity. One random fluctuation which has been used in this way is the presence of static charge. However, a sensing device is required at two points along the pipe to detect the noise signals generated by the charge and the technique of cross correlation can be applied only by use of complex and sophisticated circuitry.

In the present invention, the aim is to provide a measure of flow velocity without use of the technique of cross correlation, and with a measurement made at one position only.

According to the invention, a method of sensing the flow of a fluid comprises receiving a noise signal generated by the presence of field-generating parts of the flowing fluid, and determining the mean frequency of the received signal.

In one example the field-generating parts are electrical charges, and the voltage due to the movement of the charges is sensed. The charges may be static charges generated by fluid motion.

In another example, the field-generating parts are magnetic dipoles and the electric or the magnetic field due to movement of the dipoles is sensed. The dipoles may be in the form of particles having permanent magnetic properties.

Also according to the invention, apparatus for sensing the flow of a fluid comprises means for receiving a noise signal generated by the presence of field-generating parts of the flowing fluid, and means for determining the mean frequency of the received signal.

When the field-generating parts are electrical charges, the apparatus may comprise one or more electrodes spaced in the direction of flow, and means for sensing the voltage generated between pairs of electrodes, or between one electrode and ground, or between all electrodes and ground. Each electrode may be arranged circumferentially around the pipe through which the fluid flows, with the electrode spacing equal to electrode width in the flow direction.

When the field-generating parts are magnetic dipoles the apparatus comprises one or more magnetic field sensors spaced in the direction of flow and means for sensing the outputs of each. Each sensor could take the form of a coil of wire wrapped around the pipe through which the fluid flows; flow of a fluid carrying magnetic dipoles will result in a fluctuating electromotive force in the coil.

The means for determining the mean frequency may comprise a filter whose gain is proportional to the square root of the frequency; two squaring circuits to square respectively the filtered signal and the other part of the received signal; and dividing means to divide the time integral of one squared signal by the other whereby a voltage output is provided which is proportional to the mean frequency of the received signal, and not dependent on the absolute root mean square value of the generated signal.

The invention will now be described by way of example with reference to the accompanying drawings in which:

FIGS. 1, 2 and 3 are alternative electrode arrangements for use in a velocity meter for sensing electrically charged particles;

FIG. 4 is a coil arrangement for use in a velocity meter for sensing magnetized parts.

Figure 5:
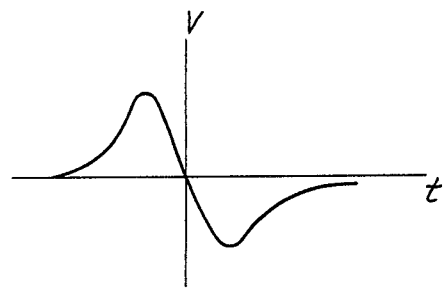
FIG. 5 illustrates the variation of voltage with time as a single charged particle passes one pair of electrodes.
Figure 6:
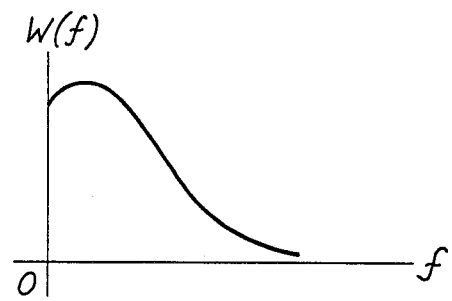
FIG. 6 shows a typical power spectrum.

In FIG. 1, a pipe 10 of insulating material contains a flowing low conductivity fluid 12. Around the outside of the pipe are six circumferential electrodes 14, of width equal to their spacing along the pipe axis. Alternate electrodes are connected by conductors 16, 18, to terminals 20, 22, and any voltage V across the terminals is sensed by suitable circuitry 24.

In FIG. 2, in a simplified version, only two electrodes 14 are provided, connected to terminals 20, 22.

In FIG. 3, in the most simple version, only one electrode 14 is provided connected to terminal 20 while terminal 22 is grounded.

In FIG. 4 a coil 42 is wrapped around a non-magnetic pipe 10 through which a fluid 12 flows carrying magnetized parts. The fluctuating e.m.f in the coil is sensed by suitable circuitry 44.

Referring now to FIGS. 2 and 5, if a single charged particle carried by the fluid flow passes between the pair of electrodes 14, the potential difference generated at the terminals 20, 22 will have the form indicated in FIG. 5; i.e. depending on the direction of flow and the positive or negative nature of the electrical charge, a potential in one sense is generated as the particle passes through one electrode, and falls to zero when the particle is between the electrodes; a potential in the opposite sense is generated as the particle passes through the other electrode.

By inspection of FIG. 5 it will be clear that the peak-to-peak time of the potential difference curve is equivalent to the time taken by the particle to travel a known distance between the two electrodes in FIG. 2. The voltage transient is not a continously alternating signal, but contains a large component at the fundamental frequency f given by:

$$f = \frac{\mu}{2d} \quad (1)$$

where $\mu$ is particle velocity, and d is the distance between the centre points of the electrodes.

In practice many electrical charges will be distributed irregularly in the fluid, and the overall effect will be a voltage noise signal, which is the sum of the alternating voltages due to each particle, but with a strong component at the fundamental frequency.

A typical power spectrum denoted mathematically by the function W(f) is shown in FIG. 5. Analysis shows that under certain quite general conditions the mean frequency $f_m$, where:

$$f_m = \frac{\int_0^\infty fW(f)df}{\int_0^\infty W(f)df} \quad (2)$$

is proportional to fluid flow rate.

An array of two electrodes is a simple form to describe, but a particularly complex voltage is generated. In the FIG. 1 arrangement using several pairs of electrodes, the fundamental frequency is more clearly defined and a simpler electronic circuit can be used.

Figure 7:
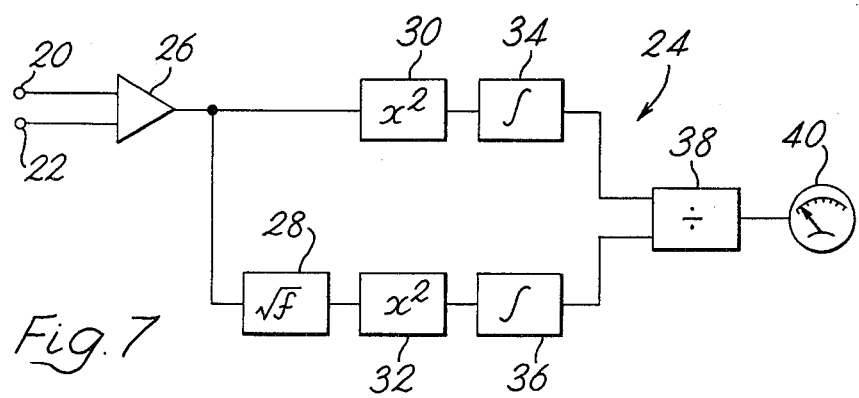
FIG. 7 shows suitable circuitry for use in a velocity flowmeter according to the invention.

Suitable circuitry for obtaining the mean frequency is illustrated in FIG. 7, and is indicated generally as reference 24. Terminals 20 and 22 are the differential inputs of an amplifier 26 the output of which is connected both directly and through a filter 28 to two similar squaring circuits 30, 32, which are connected through smoothing circuits 34, 36 to a divider 38 which supplies a d.c. voltmeter 40. The filter 28 multiplies the amplitude of the noise signal at any frequency by the square root of that frequency. The squared, smoothed signals derived from the noise signal either directly or through the filter 28 are divided by divider 38 so that the signal supplied to the d.c. voltmeter 40 is proportional to the mean frequency $f_m$ given by equation (2), and therefore to the fluid flow rate.

It is a great advantage of a flowmeter according to the invention that the electronic circuit required is relatively simple.

The invention has been described with reference to cylindrical electrodes; this is not an essential shape, but if small-area electrodes are used which do not extend very far circumferentially, there is a risk that only local flow velocity is sensed. The shape of the electrodes affects the shape of the curve in FIG. 5, as does the fluid velocity.

The invention has been described with reference to multiple electrodes (FIG. 1) the voltage across two terminals, one connected to every other electrode and the other to the remaining electrodes, being sensed by a differential amplifier. This is not an essential configuration; instead all the electrodes could be connected to one terminal and the voltage sensed between this terminal and ground.

For fluids carrying magnetized parts the invention has been described with reference to a single coil wrapped around the pipe. This is not an essential configuration; instead there could be a plurality of such coils spaced along the pipe connected in series or in parallel, or one or more coils with or without a core, or Hall probes or other magnetic field detectors positioned outside and close to the pipe.

Either the velocity of the fluid or the flow rate may be measured.

We claim:

1. A method of sensing the flow of a fluid comprises receiving a noise signal generated by the presence in the flowing fluid of field-generating parts; and determining the mean frequency of the received signal.

2. A method according to claim 1 in which parts of the fluid comprise electrical charges, and the electrical noise voltage due to the movement of the charges is sensed.

3. A method according to claim 1 in which parts of the fluid comprise magnetic dipoles, and the electric or magnetic field due to movement of the dipoles is sensed.

4. Apparatus for sensing the flow of a fluid comprises means for receiving a noise signal generated by the presence of field-generating parts of the flowing fluid; and means for determining the mean frequency of the received signal.

5. Apparatus according to claim 4 in which the means for receiving the noise signal comprises at least one electrode and means for sensing any voltage generated between the at least one electrode and ground.

6. Apparatus according to claim 4 in which the means for receiving the noise signal comprises a plurality of electrodes spaced in the direction of flow, and means for sensing any voltage generated between consecutive electrodes.

7. Apparatus according to any one of claims 4 to 6 in which the means for determining the mean frequency of the received signal comprises a filter arranged to have a gain proportional to the square root of the frequency; two squaring circuits arranged to square the filtered part and the other part of the received signal; and dividing means to divide the time integral at the squared, filtered part by the other squared part of the signal.

8. Apparatus according to claim 4 in which the means for receiving the noise signal comprises at least one coil of conducting material through which a fluid containing magnetic parts can flow, and means for sensing any fluctuating electromotive force generated in the at least one coil.

* * * * *